3,793,464
PROCESS FOR PREPARING AQUEOUS EMULSION
OF PROTEINACEOUS FOOD PRODUCTS
David T. Rusch, Wilmington, Del., assignor to ICI
America Inc., Wilmington, Del.
No Drawing. Filed Apr. 26, 1971, Ser. No. 137,603
Int. Cl. A23l 1/00, 3/00
U.S. Cl. 426—89   3 Claims

ABSTRACT OF THE DISCLOSURE

Finely-divided high protein concentrate derived from such sources as casein, alkali caseinates, soy protein, fish protein, etc., are made more palatable for human consumption by encapsulating the material with lipids derived from tallow, lard, soybean, cottonseed, and corn oils, etc., having iodine values of 1–90, and melting points above 70° F.

---

This invention relates to the process of coating protein substrates such as casein with lipids derived from edible fats to render the protein source more palatable for human consumption. The invention also deals with methods for preparing protein-rich beverage, margarines, shortenings, and other diet supplements.

Protein sources such as casein, sodium caseinate, soy protein, fish protein, and other sources usually exhibit characteristic flavors which may contribute an undesirable off-taste to foods containing them. They may also linger in the mouth as a chalky tasting precipitate. For this reason, many nutritious sources of protein have been left unexploited for human consumption.

It is an object of the invention to provide nutritious, acceptable-tasting proteinaceous food products comprising an aqueous lipid intermixture in which a substantial portion of the portein is encapsulated in lipid.

Another object of the invention is to present a process for encapsulating proteinaceous material with edible fats such that they can pass through the mouth leaving substantially no undesirable aftertaste.

Another object of the invention is to present a method for employing off-tasting highly proteinaceous materials such as casein in palatable foods in the form of pleasant tasting beverages, margarines, and shortenings.

Another object is to reduce the reactivity of protein sources by isolating them from aqueous environments with a fat coating.

Another object is to reduce the foaming action of proteinaceous materials.

These and other objects of the invention are accomplished by first coating the protein particulate with a liquified fat and thereafter dispersing the coated protein solids in aqueous and other media which do not dissolve away the protective lipid coating.

A large number of compositions are employed wherein fat-water emulsions are combined with proteinaceous materials as well as edible additives using an emulsifying agent. However, the major difference between the conventional means for preparing such a composition and the composition of this invention is the sequence of mixing the components. In conventional techniques, the protein is combined with an aqueous system prior to the addition of fat which is subsequently emulsified. Such compositions are used in topping mixes, frozen desserts, ice cream mixes, whipped creams, high protein drinks, and milk substitutes. The present invention differs in that fat and protein are mixed together prior to emulsification with the aqueous system.

Practically any source of protein can be employed by the process of the invention. Such proteinaceous sources as sodium or calcium caseinate, casein, soy protein, fish protein, gluten, and other more recently discovered protein sources can be made palatable by encapsulation with lipids such as edible fats and oils. These can be saturated or unsaturated vegetable oils or animal fats. Among the most suitable edible lipids are cottonseed oil, safflower oil, corn oil, soybean oil, butter fat, coconut oil, peanut oil, lard, chicken fats, hydrogenated cottonseed oils, corn oils, soybean oils, peanut oils, olive oils, and coconut oils. These can be used in the form of solids and plastics. Those fats having an iodine value of 1–90 and having melting points above 70° F. are particularly useful and preferred.

The fat encapsulated proteinaceous source can be dispersed in an aqueous medium using an emulsifying agent but in some instances the agent is not required. Examples of suitable emulsifying agents to be used alone or in combination are lecithin, glycerol esters, glycol esters, polyglycerol esters of fatty acid, as well as fatty acid esters of sorbitol, sorbitan, and mannitol and ethoxylated derivatives thereof.

The aqueous phase may consist of soluble additives such as sugars, glucose, sucrose, artificial sweeteners as well as flavoring, coloring agents, vitamins, and other beneficial food ingredients such as stabilizing, flavoring, and coloring agents and starch.

The composition may also contain gases such as air, carbon dioxide, or nitrous oxide to provide an effervescent beverage or a foam useful in artificial toppings and whipped cream substitutes.

Depending upon the fat employed, emulsions are best stabilized by adjusting the pH to a range between 2 and 9 with various buffering materials, depending upon the nature of the aqueous phase and the ingredients included therein.

In the practice of the invention, liquid fat can be blended with solid proteinaceous material employing an emulsifying agent if needed. The type and level of emulsifier employed is dependent upon the function desired in the finished product. In systems where water is a large portion of the product composition (such as in a beverage), care must be taken such that an excess of emulsifier does not contribute a detergent action which would strip the fat coating from the protein. A surfactant level of less than 15% (based on fat) will normally be appropriate for most preparations. In cases where the fat has a melting point above 70° F., the fat may be placed in a mixing bowl, heated to above the melting point wherein the protein can be admixed. The weight ratio of fat to protein can be from 4:5 up to 100:1, but usually a ratio of 1:1 to 4:1 is preferred.

The emulsified fat-protein blend may then be mixed with the aqueous base. Usually the emulsion of the fat-aqueous base intermixture is conducted at a temperature above the melting point of the fat mix. The conditions of the emulsifier and procedure are adjusted such that the materials form the desired oil-in-water or water-in-oil dispersion. The emulsion is easily stabilized by cooling as rapidly as possible to well below the congealing point and preferably to about 45° F. The faster the fat is congealed, the more stable the emulsion and the less chance the protein has of being leached into the aqueous phase and thereby losing its protective coating.

The invention can be illustrated by the following examples:

EXAMPLE 1

31.5 grams of coconut oil (M.P. 98–101° F.) is liquified by heating to a temperature of 130° F. and mixed with 3.5 grams of a molten emulsifier blend comprising 85% sorbitan monostearate and 15% by weight polyoxyethylene(20)sorbitan monostearate emulsifier. To this is added 35 grams of casein with vigorous agitation. This hot fat-emulsifier-casein blend is then added to 1,500 grams of an aqueous base heated to 140° F. and which contains 15% by weight sugar plus phosphoric acid and lactic acid such that the pH is adjusted to 2.8. The mix is then run through a homogenizer adjusted at 2,000 p.s.i. in the first stage and 500 p.s.i. in the second stage to form an oil-in-water emulsion. It is thereafter cooled to 45° F. and stored. Excessive foaming does not occur in the homogenizer since the reactivity of the protein is diminished.

EXAMPLE 2

An unacidified preparation similar to that of Example 1 having a chocolate flavor dissolved in the aqueous phase prior to homogenization is cooled and charged with carbon dioxide to provide a pleasant tasting carbanated chocolate beverage.

EXAMPLE 3

An emulsion concentrate is prepared by the process of Example 1 by blending 50 parts of soy protein with 80 parts of partially hydrogenated soybean oil using an emulsifier and thereafter blending the proteinaceous fat with 1,000 parts water. After homogenization and cooling, the concentrate may be added to any number of aqueous phases having different flavors and compositions.

EXAMPLE 4

High protein margarines or butter is made from fat and protein by dispersing protein in desired levels of fats. For example, 140 grams of fat and 20 grams of protein can be blended as described in the previous examples and thereafter combined with about 40 grams of water to form a water-in-oil emulsion and then congealed by rapid cooling to 50–60° F. and working in the normal fashion. The protein is easily added to the fat since it does not hydrate and subsequently lump.

EXAMPLE 5

High protein content shortenings are prepared from lard, partially hydrogenated vegetable oils, or other shortenings having suitable melting points. The fat with or without an emulsifier is melted and admixed with protein. The shortening is then congealed and worked in the normal fashion to form a product thereafter useful in foods where fat is desired and protein supplementation is needed for cakes, coatings, toppings, whiteners, confections, icings, shortening in bread rolls, etc. The advantage offered in this type of shortening is that protein supplementation can occur without the deleterious effects of too much protein that is often present with uncoated protein sources.

What is claimed is:

1. A method of forming an aqueous emulsion of a proteinaceous food product having a particulate protein material dispersed in a lipid having a melting point above 70° F. and an iodine value of 1–90 in weight ranges of lipid/protein ranging from 4:5 up to 100:1 comprising the steps of:
   (a) heating said lipid above its melting point;
   (b) dispersing said protein material in said lipid in the presence of an effective amount up to 15% by weight of said lipid of an emulsifying agent selected from the group consisting of lecithin, glycerol esters, glycol esters, polyglycerol esters of fatty acids, and fatty acid esters of sorbitol, sorbitan, and mannitol and ethoxylated derivatives thereof; thereby coating said protein material with said liquid;
   (c) admixing an aqueous medium having a pH in the range of 2–9 with said heated lipid/protein dispersion to form an emulsion, said aqueous medium being one which does not dissolve away the lipid coating; and
   (d) rapidly cooling said emulsion with simultaneous agitation to a temperature below the congealing point of said lipid.

2. A palatable, proteinaceous food product made by the process of claim 1.

3. The food product of claim 2 wherein said lipid is coconut oil or partially hydrogenated soybean oil, said protein material is casein or soy protein, said emulsifier is a blend comprisng 85% by weight sorbitan monostearate and 15% by weight polyoxyethylene(20)sorbitan monostearate.

References Cited

UNITED STATES PATENTS

| | | | |
|---|---|---|---|
| 2,937,091 | 1960 | Rosenberg | 99—2 |
| 3,124,510 | 1964 | Rosenberg | 167—81 |
| 3,397,997 | 1968 | Japikse | 99—118 |

RAYMOND N. JONES, Primary Examiner

U.S. Cl. X.R.

426—99, 307, 362